United States Patent Office 3,840,511
Patented Oct. 8, 1974

3,840,511
DIENE POLYMERISATION
Denis George Harold Ballard, Peter Anthony Robinson, Ronald John Wyatt, Eric Jones, and Alexander Joseph Peter Pioli, Runcorn, England, assignors to Imperial Chemical Industries Limited, London, England
No Drawing. Filed Feb. 18, 1972, Ser. No. 227,651
Int. Cl. C08d 1/18, 3/08, 3/12
U.S. Cl. 260—94.3                3 Claims

ABSTRACT OF THE DISCLOSURE

A conjugated diene, especially isoprene or butadiene, is polymerised using a catalyst composition comprising a titanium hydrocarbyl complex reacted with an inert support material, such as alumina. The product has a high proportion of the cis 1,4 form.

Equivalent catalyst compositions based on zirconium complexes give polymers having a high proportion of the trans 1,4 form.

---

This invention relates to the polymerisation of dienes and, especially, to the polymerisation of conjugated dienes to give predominantly cis, 1,4 poly(dienes).

In our copending application Ser. Nos. 62,184 and 62,185 we described the preparation of certain transition metal compositions and their use in the polymerisation of olefinically unsaturated monomers, including dienes.

This was exemplified, inter alia, by the polymerisation of butadiene using a zirconium based composition as initiator, the polymeric product comprising at least 90% trans 1,4 poly(butadiene). In view of this, it might be expected that if isoprene were substituted for butadiene in the same reaction trans 1,4 poly(isoprene), similar to gutta percha, would be produced. In fact, when using a zirconium based initiator this proved to be so.

We have now found that, quite contrary to exceptation, when the reaction is repeated using similar titanium based compositions as initiators the product is predominantly the commercially important cis 1,4 poly(isoprene). A similar product distribution was obtained when butadiene was polymerised using titanium based compositions.

According to the present invention we provide a process for the polymerisation of a conjugated diene to produce a polymer having a predominant proportion of cis 1,4 poly(diene) which comprises contacting the conjugated diene with a transition metal composition which is the product of reacting a titanium complex of general formula $$R_mTiX_p \qquad (1)$$

with a substantially inert matrix material having a hydroxylic surface which is free from adsorbed water, wherein R is a hydrocarbon group or substituted hydrocarbon group, X is a monovalent ligand and $m$ and $p$ are integers, $m$ having a value from 2 to 4 and $p$ having a value from 0, to 2 less than the prevailing valency of the titanium in the complex.

Hydrocarbon groups R include alkyl and alkenyl groups (including π-alkenyl groups, such as π-allyl) and substituted derivatives thereof. Examples of such complexes include tetrakis (π-methallyl) titanium.

A preferred class of organic titanium complexes are those in which some or all of the groups, or ligands, R are substituted alkyl groups of general formula $$-CH_2Y \qquad (2)$$

σ-bonded to the titanium through the carbon atoms as indicated. In this general formula Y represents an atom or group capable of interaction with the vacant d-orbitals of the metal M. Preferably all of the groups R have this formula, but it is possible for some of them to comprise other hydrocarbon groups.

Suitable substituent groups Y include aromatic and polyaromatic groups such as phenyl and naphthyl, giving rise, in formula (2) above, to the alkaryl ligands benzyl and (1-methylene-1-naphthyl) and ring substituted derivatives there, for example p-methyl benzyl.

Y may also be a cycloalkenyl group, such as a cyclooctenyl group.

Y may also comprise a group of general formula $$Z(R')_3 \qquad (3)$$

where Z represents carbon, silicon, germanium, tin or lead, and R' represents a hydrocarbon group or hydrogen; but is preferably an alkyl group.

Examples of this preferred class include tetrakis(benzyl)titanium, tris(benzyl)titanium chloride, tetrakis(1-methylene - 1 - naphthyl)titanium, tetrakis(trimethylsilylmethylene)titanium and tetrakis(neopentyl)titanium.

The monovalent ligand X, when present, serves merely to satisfy the valency and co-ordination requirements of the titanium. Examples of such ligands include halide ligands, especially chloride and bromide.

Within the term "inert matrix material" we wish to include inorganic oxides and similar oxygen containing compounds which commonly have a hydroxylic surface.

By a "hydroxylic surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the titanium hydrocarbyl complex, the bulk of the matrix material is chemically inert. A particularly good example of such a matrix material is alumina, which comprises a matrix of aluminium and oxygen atoms, to the surface of which —OH groups are attached, the hydrogen atoms of said groups having an acidic function. However, apart from the presence of these —OH groups, alumina is generally regarded as chemically inert. Within the term alumina we wish to include alumina based materials containing small amounts of other suitable inorganic oxides, such as magnesium oxide and zinc oxide. Alumina is a preferred matrix material.

It is essential that the matrix material is freed from adsorbed water, as this would merely react with and destroy the transition metal complex. The matrix materials may be readily freed from such adsorbed water by, for example, a simple thermal treatment.

The reaction between the titanium complex and matrix material comprises displacement of one or more of the hydrocarbon groups by the hydrogn atom of an —OH group or groups, with liberation of the corresponding free hydrocarbon. The reaction may be represented by the following equation:

Matrix $(-OH)_n + TiR_mX_p \rightarrow$ Matrix
$\qquad\qquad\qquad (-O)_n TiR_{m-n}X_p + nRH \qquad (4)$ wherein R, X, $m$ and $p$ have the meanings previously ascribed to them and $n$ is an integer being not more than $(n-1)$. It has been found that when the defined components of our transition metal compositions are reacted, all except one of the hydrocarbon groups of the organometallic compound may be displaced by —OH groups of the matrix, so that there is at least always one hydrocarbon group attached to the transition metal in the product. This appears to be independent of the number of reactable hydroxylic groups (as hereinafter defined) present on the surface of the matrix.

The term Matrix $(-OH)_n$ represents an inert matrix having at least $n$ reactable hydroxylic groups attached to its surface. The number of reactable hydroxylic groups, that is, the number available for our reaction, will depend on the nature and condition of the matrix material. For example, in some materials, because of their molecular configuration, some of the hydroxylic groups present are not reactive under our conditions. Thus it is usual to react the matrix, at least initially, with an excess of titanium complex, so that the number of hydroxylic groups available for the reaction may be determined.

Compositions according to the present invention may be prepared by contacting a solution of the titanium complex with a suitable matrix material, in the absence of free or adsorbed water. The solvent used for the complex should be dry and inert; hydrocarbon solvents are preferred. Since many of the titanium complexes which may be used in our process are thermally unstable, the reaction temperature must be maintained low enough to avoid decomposition of the complex. With some complexes, temperatures below 0° C. are required.

The ratio of titanium organometallic complex to matrix material may be varied within wide limits depending upon the physical and chemical nature of the components used; but it is preferred that the proportions are chosen so that each reactable hydrocarbon group reacts with a hydroxylic group.

Two methods of preparing transition metal compositions according to our invention, which allow precise and reproducible control of the composition (within the provisos mentioned above) will now be described. A first method comprises suspending the matrix material, which are previously been freed from water, in an inert liquid, and titrating the reactable hydroxylic groups with a solution of the titanium complex in an inert solvent. Since most transition metal complexes are strongly coloured, the end-point is readily detectable by the presence of a permanent colouration in the suspending solvent. In compositions prepared in this way, all the reactable hydroylic groups of the matrix are reacted with the metal complex. The compositions produced may then be recovered by filtration from the reaction medium, freed from solvent and stored dry or under solvent in oxygen-free conditions.

It is possible to add less than the complete titre of titanium complex, or even to add excess titanium complex but when excess complex is used, it is remain in the reaction medium when the composition is separated.

A second method for preparing compositions according to our invention comprises, first, adding excess of either titanium complex or a Grignard reagent (magnesium hydrocarbyl compound) to the matrix material, determining the number of molecules of hydrocarbon liberated, and then adding to a further sample of the matrix material just sufficient of the appropriate titanium complex to liberate an equivalent amount of hydrocarbon. For example, a sample of the matrix material may be suspended in a solvent and excess of a titanium π-allylic compound added. The volume of propylene produced is measured and related to the weight of matrix material. A second sample of the matrix material is then taken and a titanium π-allylic compound added until the volume of propylene produced per gram of matrix material present is equivalent to that determined by addition of excess transition metal complex.

Within the term "conjugated diene" we wish to include acyclic conjugated dienes, especially butadiene and alkyl substituted derivatives thereof such as isoprene, 2,3-dimethylbutadiene and 1-methylbutadiene. We also wish the term to include halogen substituted dienes, such as chloroprene.

By a "predominant proportion of cis 1,4-poly(diene)" we mean such a polymer having at least 50% of the cis 1,4 form and preferably at least 60% of such form.

The polymerisation process of our invention may be carried out by techniques generally used for free radical initiated polymerisation or for polymerisation processes of the type using Ziegler catalysts.

The choice of conditions of pressure and temperature will vary with factors such as the nature of the monomer and initiator, and whether bulk or diluent polymerisation is used.

For example, butadiene is most conveniently polymerised in solution in a diluent. Suitable diluents include hydrocarbon solvents such as toluene, hexane, heptane, 2,2,4,6,6-pentamethyl heptane or mixtures of such solvents. When isoprene is polymerised it may either itself be used as the bulk liquid medium or may be dissolved in a suitable diluent.

It is often convenient to perform our polymerisations at ambient or slightly elevated pressures; but polymerisations at high pressures are not precluded.

A wide range of temperatures may be used but, in general, temperatures in the range 0° C. to 100° C. may be used, the upper limit of temperature being dictated by the thermal stability of the titanium complex used as initiator.

The polymeric product may be separated from the reaction mixture by conventional means and, since our catalyst compositions are generally non-corrosive and non-toxic, it is usually unnecessary to remove the catalyst residues from the product.

The invention is illustrated by the following Examples.

EXAMPLE 1

A 500 ml. three necked flask, equipped with a stirrer and a gas-tight seal for catalyst injection, was attached to a nitrogen line via a water condenser and gas bubbler. The flask was heated overnight in an oven (95° C.) and was allowed to cool with nitrogen flowing through the assembled system. Dry, oxygen-free toluene (200 ml.) was syringed into the flask followed by double distilled isoprene (30 ml.).

High purity γ alumina was annealed by heating in air to 900° C. for 15 hours and refluxing with water for 15 hours, followed by drying at 500° C. for 2 hours under an atmosphere of dry nitrogen. It was then cooled under an atmosphere of dry nitrogen, suspended in dry oxygen-free toluene. Part of this suspension (1.7 g.) was syringed into the flask followed by Ti(benzyl)$_4$ (0.5 mM.), dissolved in toluene.

Polymerisation was allowed to continue for 3 hours at 50° C., after which time methanol (1 ml.) was added to destroy the catalyst. Poly(isoprene) (1.16 g.) was precipitated from the filtered reaction solution by the addition of methanol. The nuclear magnetic resonance (NMR) spectrum of the product showed it to be ~60% cis 1,4-poly(isoprene). The spectrum showed no trans 1,4 polymer.

By way of comparison the above Examples were repeated using a zirconium(benzyl)$_4$/γ alumina composition, the reaction being allowed to continue for 2 hours at 50° C. The product (0.3 g.) was shown by NMR to be 75% trans 1,4-poly(isoprene).

EXAMPLES 2 AND 3

A one litre three necked flask, equipped with a stirrer and a gas-tight seal for catalyst injection was attached to a nitrogen line via a water condenser and gas bubbler. The flask was heated overnight in an oven (100° C.) and was allowed to cool with nitrogen flowing through the assembled system. Dry, oxygen-free toluene (300 ml.) was syringed into the flask followed by double distilled isoprene (30 ml.). High purity γ alumina (5 g.) was dried by heating in nitrogen at 500° C. for 2 hours. It was then cooled under at atmosphere of dry nitrogen, suspended in dry oxygen-free toluene and a solution of the transition metal complex in toluene (2.5 mM.) added with stirring. Part of this suspension (=0.5 mM. of complex) was syringed into the reactor to initiate polymerisation which was continued at 25° C. for the time stated below. An anti-oxidant was added to the reaction mixture which was then filtered and poly(isoprene) was precipitated from the filtrate by the addition of methanol. The results of these experiments are summarised in Table 1 below.

Catalyst activities are expressed in g. polymer/mM. complex/hour. The structure of the polymer was determined by NMR analysis. An equivalent experiment using a zirconium tetrabenzyl complex showed that whereas the titanium complex gave rise to predominantly cis 1,4 poly(isoprene) the reverse was true for the zirconium complex.

TABLE 1

| Ex. | Transition metal complex | mM. complex | Reaction time | Activity (g./mM./hr.) | Form of poly(isoprene) Percent cis 1,4 | Percent trans 1,4 |
|---|---|---|---|---|---|---|
| 2 | Ti(Benzyl)₄ | 0.5 | 2.0 | 0.1 | ~70 | — |
|   | Zr(Benzyl)₄ | 0.5 | 2.0 | 0.4 | 10-15 | 85-90 |
| 3 | Ti(CH₂SiMe₃)₄ | 0.5 | 1.5 | 1.5 | 72 | 17 |

EXAMPLES 4 AND 5

A one litre three-necked flask was equipped with a stirrer, a gas inlet, a gas outlet via a condenser, a glass bubbler (to indicate flow), and a gas-tight seal for catlyst injection. The flask was heated overnight in an oven (100°) and was allowed to cool with nitrogen flowing through the system. Dry, oxygen-free toluene (300 ml.) was syringed into the flask, heated to 60° C. and high purity, dry, oxygen free butadiene was then passed through the stirred solvent. When the solvent had become saturated with butadiene, 0.5 mM. of a transition metal complex/γ alumina composition (prepared as described in Examples 2 and 3) was added to initiate polymerisation which was continued for the time stated below. The butadiene flow rate was maintained at 0.8 litres/minute throughout the polymerisation. Poly(butadiene) was precipitated from the filtered reaction medium by the addition of methanol. The results are summarised in Table 2 below.

The catalyst activity is expressed in units of g. polymer/ mM. transition metal complex/atmosphere of butadiene/ hour and the polymer structure was determined by infrared spectroscopy (IR). The results of polymerisations using equivalent zirconium complexes are included by way of comparison. It will be seen that titanium-based catalysts produced predominantly cis 1,4-polymer whereas the zirconium-based catalysts produced a high proportion of the trans 1,4-polymer.

TABLE 2

| Example | Transition metal complex | mM. complex | Reaction time | Activity (g. mM./at/hr.) | Form of poly(butadiene) Percent cis 1,4 | Percent trans 1,4 | Percent 1,2 |
|---|---|---|---|---|---|---|---|
| 4 | Ti(Benzyl)₄ | 0.5 | 1.5 | 4 | 60 | 25 | 15 |
|   | Zr(Benzyl)₄ | 0.5 | 1.0 | 17.0 | — | 90 | — |
| 5 | Ti(CH₂SiMe₃)₄ | 0.5 | 1.5 | 16 | 75 | 20 | 5 |
|   | Zr(CH₂SiMe₃)₄ | 0.5 | 1.0 | 39 | 53 | 42.5 | 4.5 |

What we claim is:

1. A process for the polymerisation of a conjugated diene to produce a polymer having a predominant proportion of cis 1,4 poly(diene) which comprises contacting the conjugated diene under moisture- and oxygen-free conditions with a transition metal composition which is the product of reacting a titanium complex of general formula $R_4Ti$ with alumina which is free from adsorbed water, wherein R is a hydrocarbon group or substituted hydrocarbon group of formula —$CH_2Y$ where Y is a phenyl or naphthyl group, or a group of formula $Z(R')_3$ where Z is silicon and each R' is a hydrocarbon group or hydrogen.

2. A process as claimed in claim 1 in which the conjugated diene is butadiene or isoprene.

3. A process as claimed in claim 1 in which the titanium complex is tetrakis(benzyl)titanium or tetrakis(trimethylsilylmethylene)titanium.

References Cited

UNITED STATES PATENTS

| | | | |
|---|---|---|---|
| 3,178,402 | 4/1965 | Smith et al. | 260—94.2 R |
| 3,326,877 | 6/1967 | Orzechowski et al. | 260—94.3 X |
| 3,392,160 | 7/1968 | Orzechowski et al. | 260—94.3 |
| 3,422,128 | 1/1969 | Wilke | 260—94.3 X |
| 3,454,538 | 7/1969 | Naarmann et al. | 260—94.3 X |

FOREIGN PATENTS

| | | | |
|---|---|---|---|
| 1,145,958 | 3/1969 | Great Britain | 260—94.9 |
| 1,495,160 | 3/1969 | Germany | 260—94.9 |

OTHER REFERENCES

Giannini et al.: "Benzyltitanium Compounds," Chemical Communications, 1968.

JOSEPH L. SCHOFER, Primary Examiner

W. F. HAMROCK, Assistant Examiner

U.S. Cl. X.R.

252—430, 431

PO-1050
(5/69)

UNITED STATES PATENT OFFICE
CERTIFICATE OF CORRECTION

Patent No. __3,840,511__   Dated __October 8, 1974__

Inventor(s) __Denis George Harold Ballard et al__

It is certified that error appears in the above-identified patent and that said Letters Patent are hereby corrected as shown below:

In the heading of the patent, add:

--Foreign Application Priority Data,

February 26, 1971    Great Britain ..... 5547/71--

Signed and sealed this 31st day of December 1974.

(SEAL)
Attest:

McCOY M. GIBSON JR.
Attesting Officer

C. MARSHALL DANN
Commissioner of Patents